United States Patent
Thomas, III

(10) Patent No.: US 9,223,166 B2
(45) Date of Patent: Dec. 29, 2015

(54) POSITIONAL INPUT SYSTEMS AND METHODS

(75) Inventor: Fred Charles Thomas, III, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 13/980,884

(22) PCT Filed: Sep. 16, 2011

(86) PCT No.: PCT/US2011/051968
§ 371 (c)(1),
(2), (4) Date: Jul. 21, 2013

(87) PCT Pub. No.: WO2013/039514
PCT Pub. Date: Mar. 21, 2013

(65) Prior Publication Data
US 2013/0308066 A1    Nov. 21, 2013

(51) Int. Cl.
G02F 1/1333     (2006.01)
G06F 3/03       (2006.01)
G02F 1/1335     (2006.01)

(52) U.S. Cl.
CPC ...... *G02F 1/13338* (2013.01); *G02F 1/133528* (2013.01); *G06F 3/0321* (2013.01); *G02F 2001/133538* (2013.01)

(58) Field of Classification Search
CPC .......... G02F 1/13338; G02F 1/133528; G02F 1/1335; G02F 1/133553; G02F 1/1336; G02F 2001/133538; G02F 3/0321

USPC ............. 349/12, 96, 65, 117, 187; 178/18.01; 345/73
See application file for complete search history.

(56) References Cited

U.S. PATENT DOCUMENTS

| | | | |
|---|---|---|---|
| 6,538,644 B1 | 3/2003 | Muraoka | |
| 2004/0239647 A1 | 12/2004 | Endo | |
| 2007/0290047 A1 | 12/2007 | Tazaki et al. | |
| 2008/0197518 A1 | 8/2008 | Aylward et al. | |
| 2010/0283885 A1 | 11/2010 | Lin et al. | |

(Continued)

FOREIGN PATENT DOCUMENTS

| | | |
|---|---|---|
| CN | 101779186 | 7/2010 |
| CN | 101930321 | 12/2010 |
| EP | 1081633 | 3/2001 |

(Continued)

OTHER PUBLICATIONS

Kunio Sakamoto and Takeru Furukawa, "Invisible Code Display for Robots' Eye Communication Using Polarization Control by LCD Panel," Proc. SPIE 7852, 76520V, Oct. 18, 2010, Beijing, China, pp. 1-2. Available at: <dx.doi.org/10.1117/12.869452>.

(Continued)

*Primary Examiner* — Thoi Duong
(74) *Attorney, Agent, or Firm* — Hewlett-Packard Patent Department

(57) ABSTRACT

Positional input systems and methods are provided. A positional input method can include passing (210) a polarized light generated by a source through a predetermined pattern of visibly transparent polarizing elements disposed on the surface of a display device. The method further includes detecting (220) a change in the polarization state of the polarized light corresponding to a location on the display device.

13 Claims, 6 Drawing Sheets

(56) References Cited

U.S. PATENT DOCUMENTS

| | | |
|---|---|---|
| 2011/0134380 A1 | 6/2011 | Inoue et al. |
| 2011/0267317 A1* | 11/2011 | Tsuda .................. 345/175 |

FOREIGN PATENT DOCUMENTS

| | | |
|---|---|---|
| JP | H06-230897 A | 8/1994 |
| JP | 2001-243006 A | 9/2001 |
| JP | 2005135329 | 5/2005 |
| JP | 2007-279129 A | 10/2007 |
| JP | 2008-077451 A | 4/2008 |
| JP | 2008-108236 A | 5/2008 |
| TW | I261126 B | 9/2006 |
| TW | 200949384 A | 12/2009 |
| TW | 201027125 A | 7/2010 |
| TW | 201039616 A | 11/2010 |
| WO | WO-02/093237 A1 | 11/2002 |

OTHER PUBLICATIONS

Tomofumi Yamanari et al., "Eelctronic Invisible Code Display Unit for Group Work on Reminiscence Therapy," Proceedings of the International MultiConference of Engineers and Computer Scientists 2009 vol. 1, IMECS 2009, Mar. 18-20, 2009, Hong Kong, pp. 1-6.

* cited by examiner

POSITIONAL INPUT SYSTEMS AND METHODS

BACKGROUND OF THE INVENTION

Description of the Relate Art

Modern industrial design continues to increase reliance on combined input output devices. Devices such as capacitive or resistive touch screens provide an elegant, simple, and industrially "clean" design for providing both input (touch) and output (display) capabilities. A touchscreen can be formed by placing a transparent overlay proximate the display surface. Such overlays typically detect the presence and location of input (i.e., a "touch") based upon a change in electrical properties of the overlay. While the level of touch accuracy and resolution using such devices is sufficient for many consumer electronics, the accuracy and resolution are frequently insufficient for use in professional applications requiring a high degree of touch accuracy and resolution.

Providing a high resolution touch and/or positional based input device acceptable to professional or commercial users presents a challenge. A system providing the expected level of accuracy and resolution demanded by professionals frequently provides an unacceptably opaque or "window-screen-like" appearance when disposed proximate a display.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
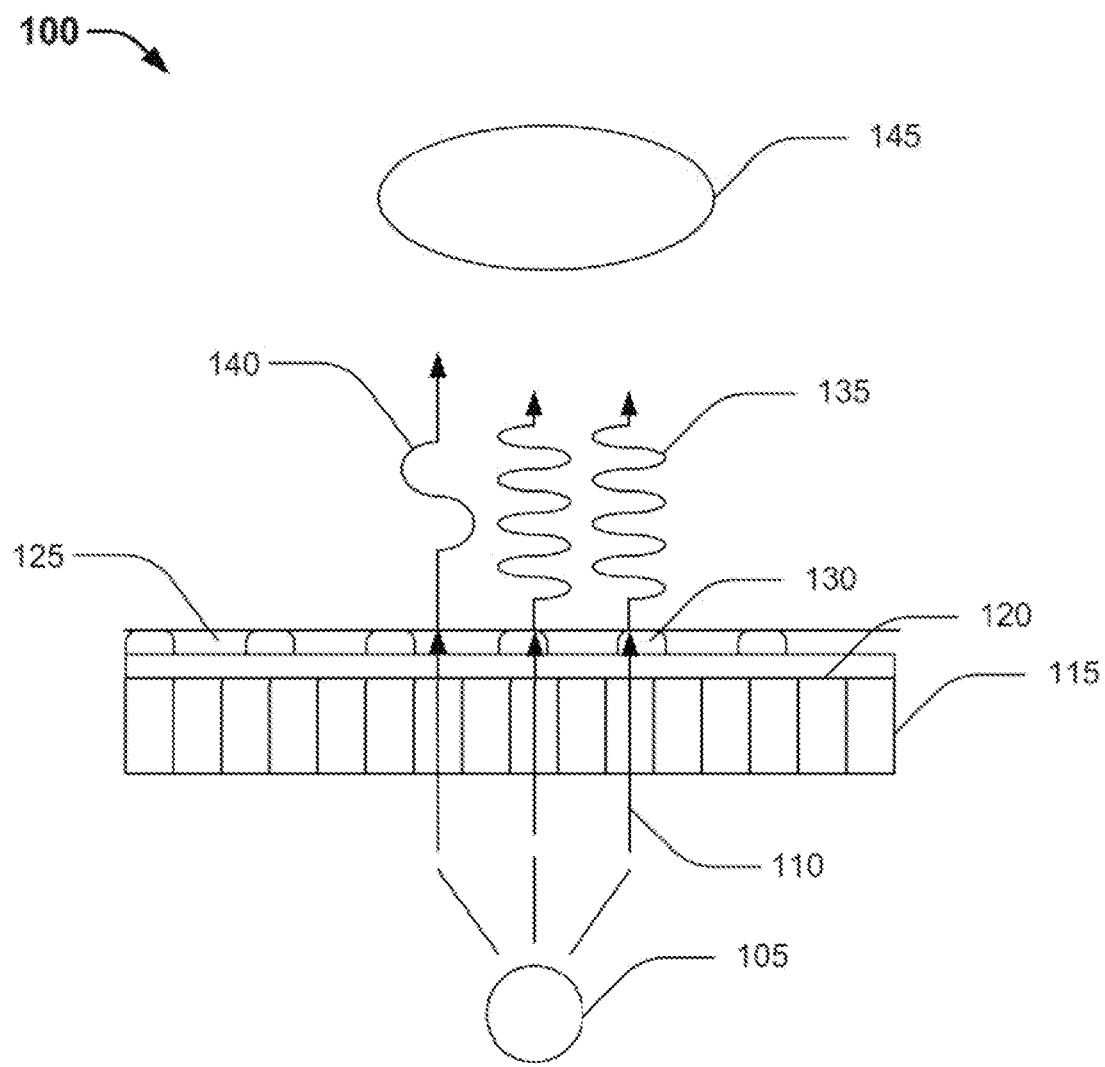
FIG. 1 is a block diagram depicting a sample positional input system using a polarized light source, according to an embodiment described herein.

Display based input devices find increasing acceptance and use within both industry and the home. While conventional resistive and capacitive touch based input systems have found widespread use and acceptance within the consumer and commercial market space, the difficulty in providing an accurate, high resolution, touch based input limits the acceptance of such devices within the professional and commercial market spaces. Increasingly sophisticated demands within the consumer and commercial market space are also receptive to higher resolution, higher accuracy, touch-based displays.

Capacitive and resistive touch sensors have seen use in display devices ranging from small screen cell phones and portable media players to large cinema or multi-screen "touchwall" displays. Such technology has the advantage of providing only a minimal impact on the appearance of the data provided by the display, however the inherent limitations of electrical based touch technology used to provide resistive and capacitive touch sensors serves to restrict the resolution and accuracy of such devices.

Providing a visually transparent input system and method having a high resolution and increased accuracy would enable the use of touch-based displays in professional applications and in an increasing number of consumer and commercial applications. Detection based technologies using a detector and predetermined series of elements usually in the form of elements, dots, or similar marks can provide systems and methods for providing a high-accuracy and high-resolution input to a display device. Providing a detectable, yet visually transparent carrier having a predetermined pattern of visually transparent elements, dots, or marks on its surface provides a system and method for using a display device as a highly accurate input device having a high degree of contact point positional input resolution.

An example predetermined pattern is that provided by Anoto Group AB (Lunds, Sweden). Using a unique, predetermined element pattern such as that offered by Anoto, a defector can determine its location with respect to the pattern when placed proximate the pattern. By increasing the density of the elements (i.e., increasing the dot density by decreasing the distance between the elements, and possibly be decreasing the size of the elements themselves) the location resolution capability of the detector is commensurately increased. A visibly transparent, predetermined, element pattern disposed in, on, or about a visibly transparent carrier provides input systems and methods having a high degree of accuracy and resolution. The transparency of the elements and carrier permits the use of such systems and methods with display devices.

Positional input systems and methods are provided. An illustrative positional input method can include passing a polarized light generated by a source through a predetermined pattern of visibly transparent polarizing state altering elements disposed on the surface of a display device. The method further includes detecting a change in the polarization state of the polarized light corresponding to a location on the display device.

As used herein, the term "light" refers to electromagnetic radiation falling within the spectrum visible to humans—the spectrum extends from 400 nanometers (violet) to 800 nanometers (red). The term "light" may also include electromagnetic radiation falling within the infrared spectrum, extending from 800 nanometers to 3000 nanometers.

An illustrative positional input system can include a polarized light source and a predetermined pattern of visibly transparent polarizing state altering elements to change the polarization state of the polarized light. The system can further include a detector to determine a location based upon the encoded element pattern with high resolution positional information being discriminated from their background via the contrast provided by differing polarization state between the position encoding element pattern and its background.

Another illustrative positional input system can include a liquid crystal display ("LCD") including a linearly polarized backlight and a plurality of visibly transparent polarizing state altering elements disposed in a predetermined pattern on an exterior surface of the liquid crystal display. Each of the visibly transparent polarizing altering elements can change the polarization state of the linear polarized light to ¼ wave retarded light of a particular circular polarization handedness. The system can further include a handheld member including: a detector, with a element discriminating circular polarizing element, to determine a location on the LCD based upon the information encoded in the discriminated element pattern with changed polarization state from the original input linear polarized light; and a transmitter to transmit the location of the handheld member to a computing device communicatively coupled to the handheld member.

FIG. 1 is a block diagram depicting a sample positional input system 100 using a polarized light source 105, according to an embodiment. The system 100 can include a polarized light source 105 providing light having a polarization state 110. The polarized light source 105 can be within or proximate to a display device including a display 115 having a surface 120. A carrier 125 having a predetermined pattern of visibly transparent polarization altering elements 130 can be disposed proximate the surface 120 to change or otherwise alter the polarization state 110 of at least a portion of the incident light produced by the polarized light source 105 to provide light having a changed polarization state 135. The polarization state of light passing through the carrier 125 but NOT passing through a polarizing element 130 is changed to a polarization state 140 that differs in one or more characteristics from light having polarization state 110 (i.e., light from the source 105) and light having changed polarization state 135 (i.e., light exiting from one of the polarizing elements 125).

The differing changed polarization states 135, 140 of the light exiting the display 115 enables the "reading" of the pattern of polarizing elements 130 using a detector 145 capable of distinguishing the changed polarization states 135, 140. Reading the pattern of polarizing elements is possible based upon the detectors ability to discern the changed polarization state 135 of light exiting the polarizing elements 130 from the background changed polarization state 140 of light exiting the carrier 125.

Based upon the unique encoded absolute positional information between the visibly transparent polarizing elements 130, the detector can determine its location on the surface 120 of the display 115. The pattern and density of the visibly transparent polarizing elements 130 contributes to the accuracy of the detector 145 in determining its location with respect to the display 115. A higher density pattern of visibly transparent polarizing elements 130 disposed across the surface 120 of the display 115 generally improves the accuracy of the location determination by the defector 145. Based upon the unique encoded absolute positional information between the visibly transparent polarizing elements 130, an extremely precise determination of detector 145 location with respect to the pattern of polarizing elements 130 is possible.

The polarization state 110 may include a plurality of polarization states. However, in some embodiments, the light can be provided using a polarized light source 105 generating light having ONLY the polarization state 110 (e.g., a linear polarized light source producing only one of a vertically polarized light or a horizontally polarized light). In yet other embodiments, the light may be provided using a non-specific polarized light source 105 generating light having a plurality of polarization states (e.g., a polarized light source 105 producing at least two of vertically, horizontally, or circularly polarized light). The light produced using a non-specific polarized light source 105 can be filtered or similarly adjusted to provide light having only the polarization state 110. The polarized light source 105 can include any number of individual polarized light sources.

The display 115 can have a surface 120 from which light having the polarization state 110 exits or is otherwise emitted. The display 115 may incorporate any technology, for example liquid crystal display (LCD) technology; light emitting diode (LED); organic LED (OLED); active matrix OLED (AMOLED); or any other display technology. Although not depicted as such in FIG. 1, the polarized light source 105 may be incorporated into the display 115, for example the independent LEDs forming an LED display 115 may each be considered a polarized light source 105. Alternately, LCD displays emit linear polarized light via their inherent design.

A carrier 125 having predetermined pattern of visibly transparent polarizing elements 130 disposed therein can be disposed proximate the surface 120 to change or otherwise alter the polarization state 110 to provide light having a changed polarization states 135 (for light passing through the polarizing element 130) and 140 (for light passing through the carrier 125). The predetermined pattern of visibly transparent polarizing elements 125 may be applied directly to the surface 120 of the display 115. However, in other embodiments, the predetermined pattern of visibly transparent polarizing elements 125 may be applied to a substrate or carrier, for example a material that does not affect the polarization state of light transiting the substrate or carrier, that can in turn be applied to the surface 120 of the display 115 via a bonding agent.

The polarization state of light passing through each the transparent polarizing elements 130 disposed on the surface 120 of the display 115 can be altered or otherwise changed based upon polarizing element 130 physical characteristics, composition, or any combination thereof. Each of the transparent polarizing elements 130 can be composed of a material, for example a polymeric material, capable of transforming or otherwise altering the polarization state of light passing through the polarizing element. For example, linear vertically polarized light generated by a source and passing through a polarizing element 130 may be phase retarded ¼ wave in one direction, for example left or right, while the linear polarized light passing through only the carrier 125 may be phase retarded ¼ wave in the opposite direction. Other changes in polarization state of the light passing through the carrier 125, the polarizing elements 130, or both may be used. Similarly, any polarized light source 105 may be used such that the changed polarization state 135 of the light passing only through the polarizing elements 130 is distinguishable from the changed polarization state 140 of the light passing only through the carrier 125.

An example polymeric material capable of providing the transparent polarizing elements 130 can include, but is not limited to, a photo-aligned, anisotropic optical thin film such as that produced by Rolic® Research Ltd., although other materials and other manufacturers capable of providing similar polarization based filtering capabilities may be substituted. Rolic® provides a curable, liquid, light controlled molecular orientation ("LCMO") polymeric material suitable for photo lithographically producing the polarizing elements 130 within the carrier 125. Through the use of LCMO materials it is possible to create structured optical elements on a microscopic or macroscopic scale using light-induced spatial alignment of molecules within the LCMO material. LCMO aligns molecules, for example the molecules forming the polarizing elements 130, in a predefined way in photo alignment layers by irradiating them with ultra-violet polarized light. Based upon the choice of materials and the direction of incidence and polarization of the light used to form the polarizing elements 130, it is possible for the molecules forming the polarizing elements 130 to be aligned in any direction of the three-dimensional space. An index of refraction birefringence maybe introduced in the material hence producing these polarization altering phase retarding elements.

When disposed upon or formed within a suitable carrier 125, the visibly transparent polarizing elements 130 are not visible to the naked eye when back-illuminated (for example, when back illuminated by the polarized light source 105). The visibly transparent polarizing elements 125 can be deposited on or otherwise formed within the substrate using any method or system, including but not limited to, photolithography and conventional printing technologies.

The polarizing elements 130 can be disposed within the carrier 130 in a unique, specific, spatial or positional pattern. The use of such a pattern creates a geographic relationship between the polarizing elements 130 and their location on the display 115. The geographic relationship between the polarizing elements 130 and the display 115 permit the ability to determine the location of the detector 145 sensitive to the changed polarization state 130 of the light emitted by the polarizing elements 130 when the detector 145 is disposed proximate the display 115.

The pattern of light having the changed polarization state 130 sensed by the detector 145 permits the precise determination of the physical location of the detector 145 on the display 115. Increasing toe number or density of the polarizing elements 130 (for example by forming greater numbers of physically smaller, closer grouped polarizing elements 130) enhances the location defection capability of the detector 145. The size of each of the polarizing elements can vary based on factors such as desired resolution, mastering technique, and the overall size of the display 115 however in general the size of the polarizing elements 130 is on the order of 40 microns and can be as small 5 to 10 microns diameter.

An example pattern capable of providing unique encoded absolute positional information between the visibly transparent polarizing elements 130 is the Anoto dot pattern described above. Disposing the polarizing elements 130 in an Anoto compliant pattern provides a unique location identification system using the detector 145 capable of detecting the changed polarization state 135 of the light passing through the polarizing elements 130. Although the Anoto dot pattern is used as an illustrative example, any comparable predetermined pattern capable of providing unique encoded absolute positional information between the visibly transparent polarizing elements 130 may be similarly employed to dispose or locate the polarizing elements 130 in, on, or about the carrier 125.

Since changes in the polarization state of light are imperceptible to the human eye, the light emitted by the display 115 will appear uniform across the display regardless of the changed polarization state 135, 140 of the light. The ability to provide a visually transparent carrier 125 containing visually transparent polarizing elements 130 enables the use of a defector 145 sensitive to the changed polarization state 135 of the light passing through the polarizing elements 130 to determine the physical location or position of the detector 145 on the display 115 while at the same time providing minimal impairment of the user's view of the display 115. The ability to provide location based data to the detector 145 while simultaneously providing a minimally impaired view of the display 115 to the user provides the display with the ability to contemporaneously function as both an input device (i.e., a device capable of detecting location based input via the detector 145) and an output device (i.e., a display capable of displaying data). An example of the utility of such a device can be found in a display based input tablet—such a tablet would enable easy, customizable, user configuration of various tiles and input designators on the tablet surface.

The detector 145 can include any device, system, or combination of systems and devices suitable for detecting the changed polarization 135 of the light exiting the polarizing element 130. For example, a detector 145 sensitive to the changed polarization state 135 of the light exiting the polarizing elements 130 can incorporate a Wollaston prism, similar in technology to that used in magneto-optical data storage devices, to identify light having the changed polarization state 135. Alternatively, a circular polarizer of appropriate handedness could be used to discriminate patterns that use ¼ wave polarizing elements 130. Other polarization sensitive technologies with similar performance can be used as the basis for the detector 145.

Where the defector 145 will be used as an Input device to a tablet or where the detector 145 will be used similar to a drafting pen, physical displacement of the detector 145 across the surface 120 of the display 115 affects the scan rate, exposure, and blur reduction capacities of the detector 145 to property discern the pattern of polarizing dots 135. Additional logic can therefore be incorporated into the detector 145 to increase or decrease the defector scan rate based at least in part upon the velocity with which the detector is moved across the surface 120 of the display 115. Similarly, the logic providing for exposure compensation and blur reduction can also be incorporated into the detector 148 based at least in part upon the velocity with which the detector is moved across the surface 120 of the display 115.

Figure 2:
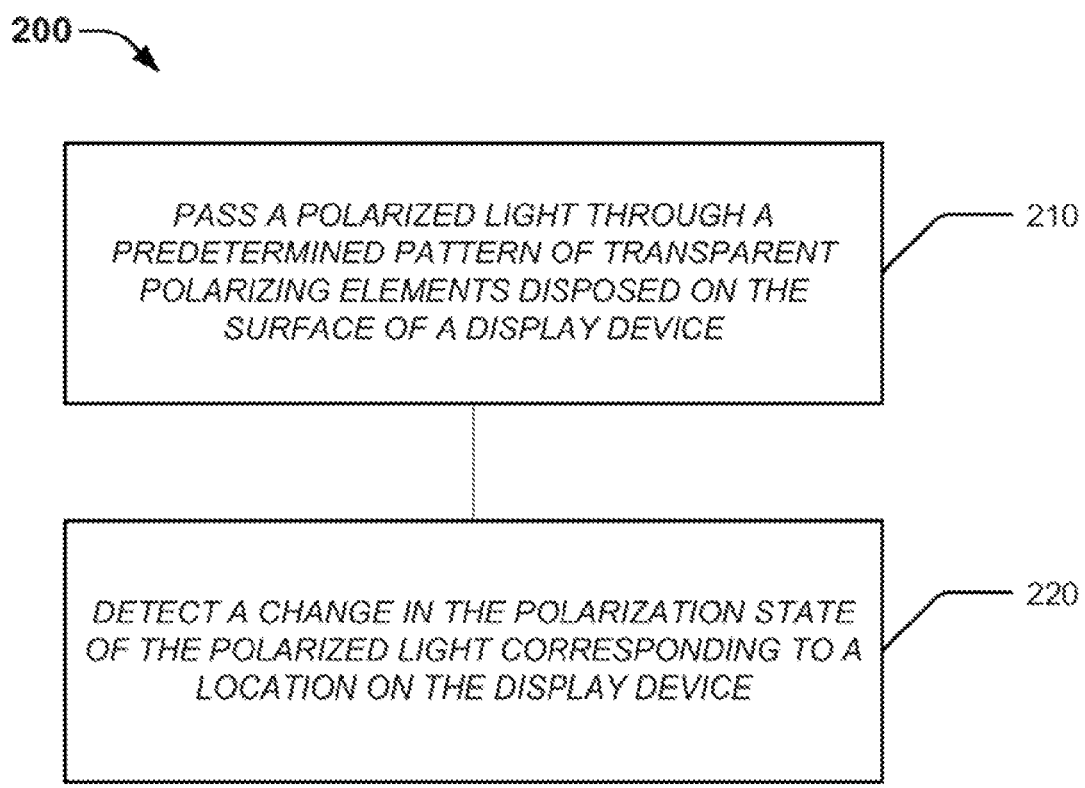
FIG. 2 is a flow diagram depicting a sample positional input method using an internal first polarized light source, according to an embodiment described herein.

FIG. 2 is a flow diagram depleting a sample positional input method 200 using an internal first polarized light source 105, according to an embodiment. A polarized light having the polarization state 110 can be passed through a carrier 125 containing a predetermined pattern of transparent polarizing elements 130. A detector 145 having the capability of distinguishing the changed polarization state 135 of light passing through the polarizing element 130 from the changed polarization state 140 of light passing through the carrier 125.

At 210 a portion of light generated by the polarized light source 105 and having the polarization state 110 can pass through the carrier 125, while the remaining portion of the light generated by the polarized light source 105 and having the polarization state 110 can pass through the visually transparent polarizing elements 125 disposed on a surface 120 of a display device 115. The polarization state 110 can include light having a single polarization state, multiple polarization states, or no polarization state. Where light having multiple polarization states or no polarization state is used, the polarization stats 110 may be a single polarization state provided using a filter disposed between the source 105 and the display 115.

At 220 the changed polarization state 135 of the light exiting the polarizing elements 130 is detected. The unique encoded absolute positional information between the visibly transparent polarizing elements 130 corresponds to a unique physical location of the detector 145 on the surface 120 of the display 115.

Figure 3:
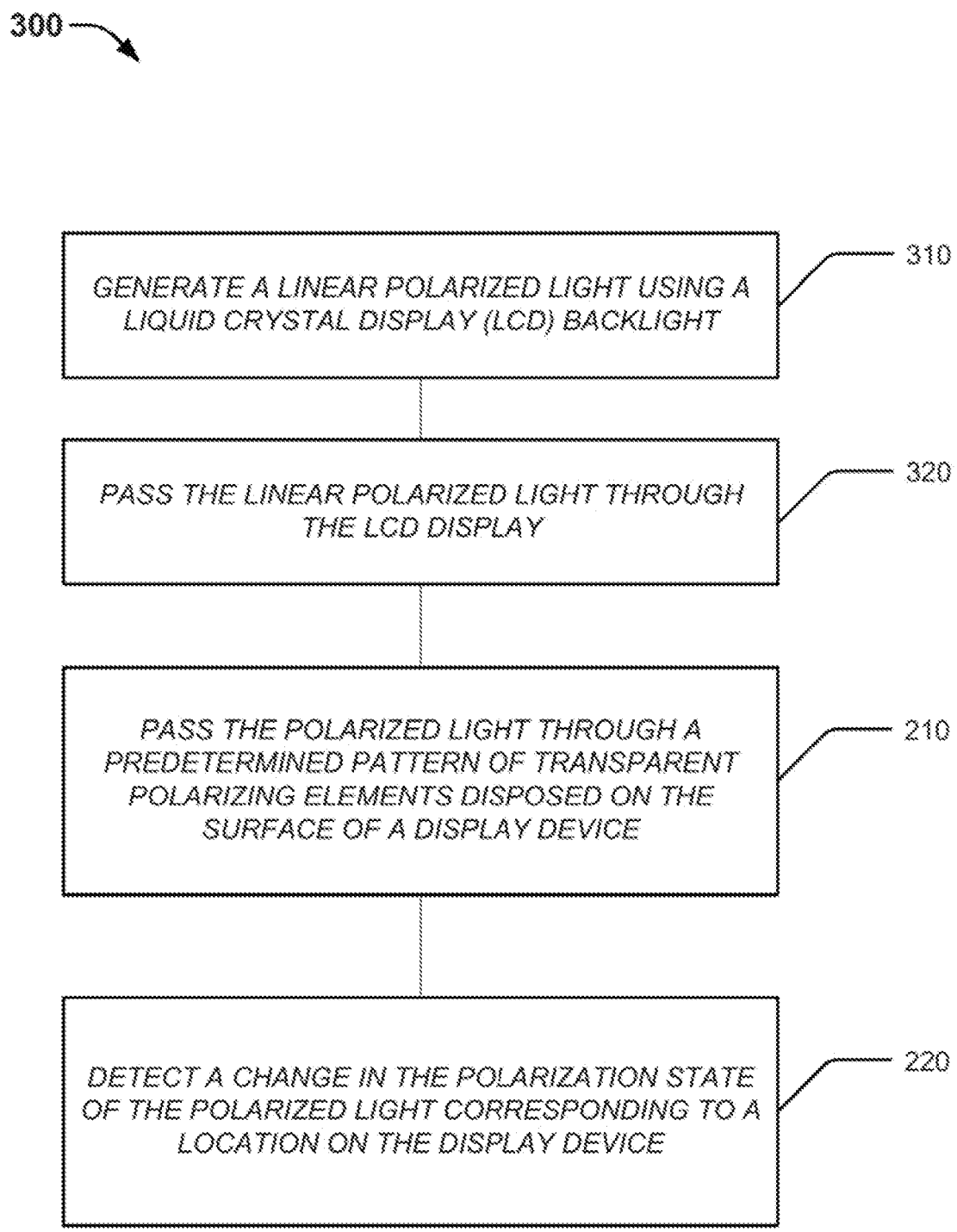
FIG. 3 is a flow diagram depicting another sample positional input method using the first polarized light source as a liquid crystal display (LCD) backlight, according to an embodiment described herein.

FIG. 3 is a flow diagram depicting another sample positional input method 300 using the polarized light source 105 as a liquid crystal display (LCD) backlight according to an embodiment. In the example provided by FIG. 3, a linearly polarized light source 105 is used in conjunction with a liquid crystal display (LCD) display 115. While a linearly polarized light source is described in the context of FIG. 3, a similar polarized light source or sources 105 having any polarization state 110 may be similarly substituted.

At 310 light having the polarization state 110 is generated using a polarized light source 105 serving at least in part as an LCD panel backlight. The polarized light source 105 is located on the non-viewable, or reverse, side of the display 115, in this example an LCD panel.

At 320 the linearly polarized light 110 generated by the polarized light source 105 can pass through the display 115, exiting the surface 120 of the LCD display. The linearly polarized light provided by the display is passed through the LCD panel (i.e., the display 115) and exits the surface 120 of the LCD panel remaining in a linear polarization state 110 but 90 degrees rotated or orthogonal to the polarized light sources linear polarization. After exiting the LCD panel 115, a portion of the linearly polarized light 110 passes through the carrier 125, while the remaining portion of linearly polarized light 110 passes through the polarizing elements 130. The polarization state of the linear polarized light 110 passing through the polarizing elements 130 attains a changed polarization state 135, while the polarization state of the linear polarized light 110 passing through the earner 125 attains a changed polarization state 140.

Figure 4:
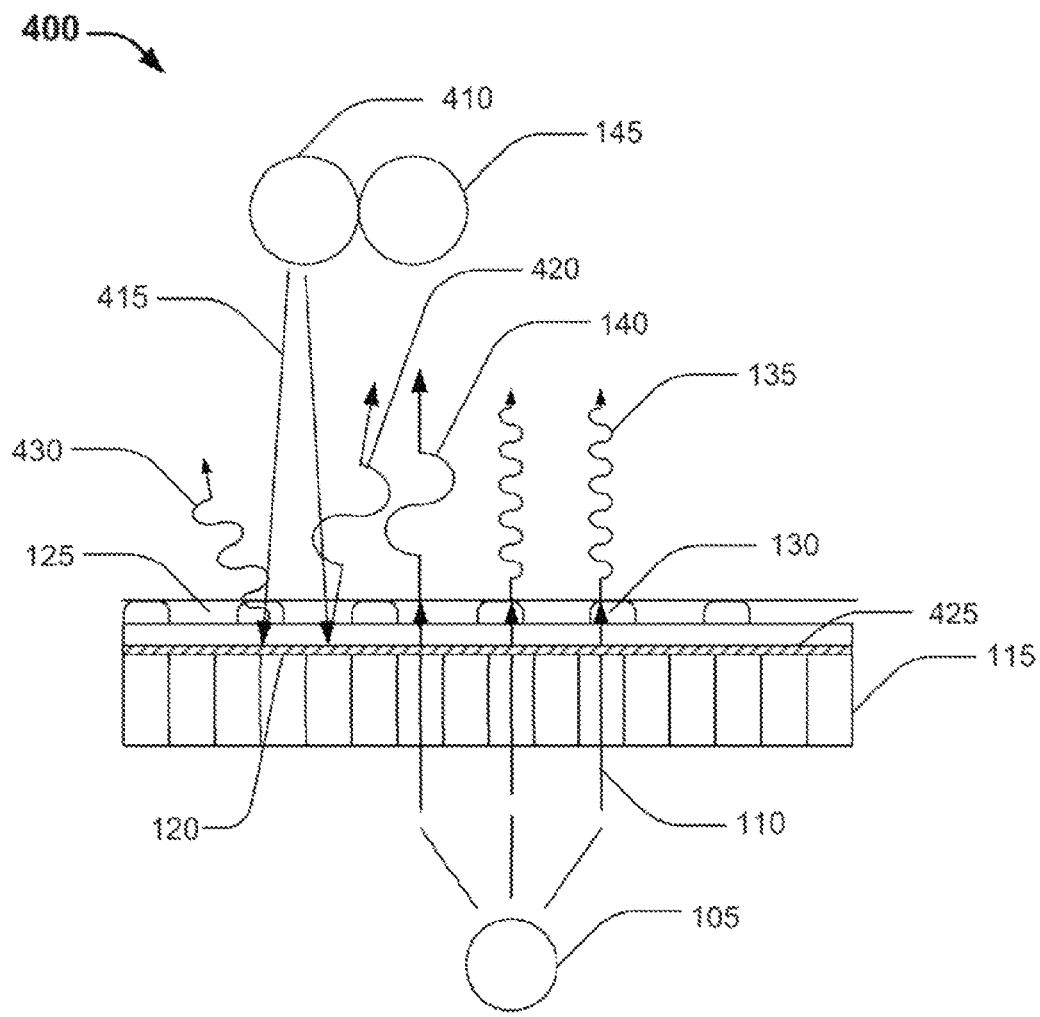
FIG. 4 is a block diagram depicting another sample positional input system using an external second polarized light source, according to an embodiment described herein.

FIG. 4 is a block diagram depicting another sample positional input system 400 using an external second polarized light source 410, according to an embodiment. At times, a second polarized light source 410 can be disposed external to the display 115, for example within a handheld member useful for data input. In the example depicted in FIG. 4, two polarized light sources are used, the polarized light source 105 used as a backlight for the display 115, and the second polarized light source 410 positioned external the display 115. The polarized light source 105, 410 use differing polarization states, wavelengths or polarization states and wavelengths. Since the detector 145 relies upon light emitted from the display 115, the display 115 may have a translucent, reflective, material 425 disposed proximate the carrier 125 containing the pattern of transparent polarizing elements 130. The translucent, reflective, material 425 can permit the passage of the polarized light 110 from the surface 120 of the display 115, while reflecting at least a portion of the second polarized light 415 provided by the second polarized light source 410.

The inbound light provided by the second polarized light source 410 and having the second polarization state 415 falls upon the carrier 125 and polarizing elements 130. A portion of the light passes through the carrier 125 resulting in a changed polarization state 420. The remaining portion of the light passes through the polarizing elements 130 resulting in a changed polarization state 430.

Regardless of whether the inbound light strikes the carrier 125 or the polarizing elements 130, light having the changed polarization states 420, 430 is reflected by the material 425 disposed between the carrier 125 and the surface 120 of the display 115. Since reflection does not affect the polarization of light, the outbound/reflected light retains the changed polarization states 420, 430. The reflected light will however be affected by the outbound/reflected passage through the carrier 125 or polarization elements 130.

For example, if the carrier 125 retards the polarization of incident light by ⅛ wave counterclockwise and the polarization elements 130 retard the polarization of incident light by ⅛ wave clockwise, the polarization of light having polarization state 415 will be retarded ⅛ wave counterclockwise by passing through the carrier 125; upon reflection from material 425, the reflected light will again be retarded ⅛ wave counterclockwise as it reflects back through the material 425, for a total changed polarization state 420 of ⅛ (inbound)+⅛ wave (reflected)=¼ wave counterclockwise (total). Similarly, inbound light incident upon the polarization element 130 will be retarded ⅛ wave clockwise by passage through the polarization element 130, and upon refection from the material 425, the reflected light will again pass through the polarization element 130 where it will be further retarded by ⅛ wave clockwise for a total changed polarization state 430 of ⅛ wave (inbound)+⅛ wave (outbound)=¼ wave clockwise (total). Although illustrated using ⅛ wave retardation, other changes in polarization are possible with comparable performance.

Thus, by using the second polarized light source 410, the changed polarization state 430 of the second polarized light 415 allows the determination of the defector 145 location on tee surface 120 of the display 115.

Disposed external to the display 115, the second polarized light source 410 can be co-located with the detector 145, for example both can be disposed within a single member that comfortably fits within a user's hand. In other embodiments, the second polarized light source 410 can be located separate or at a distance from the defector 145, for example where the second polarized light source 410 is used for general or area illumination and the detector 145 is disposed within a handheld member. The second polarized light source 410 may generate a second polarized light 415 invisible to the naked eye, for example a polarized near infrared light. An example second polarized light source 415 is a near light emitting diode (LED).

Similar to the polarized light source 105 described above with reference to FIG. 1, the second polarized light source 410 provides light having the second polarization state 415. The wavelength of the light produced by the second polarized light source 410 differs from the wavelength of the light produced by the polarized light source 105. The polarization state 415 may include a plurality of polarization states. However, in some embodiments, the light can be provided using a polarized light source 410 generating light having ONLY the second polarization state 415 (e.g., a linear polarized light source producing only one of a vertically polarized light or a horizontally polarized light). In yet other embodiments, the light may be provided using a non-specific polarized light source 410 generating light having a plurality of polarization states (e.g., a polarized light source 410 producing at least two of vertically, horizontally, or circularly polarized light). The light produced using a non-specific polarized light source 410 can be filtered or similarly adjusted to provide light having only the second polarization state 415. The polarized light source 410 can include any number of individual polarized light sources.

The translucent, reflective, material 425 is disposed at or near the surface 120 of the display 115. In some embodiments, the material 425 may be partially or completely incorporated into the carrier 125. In other embodiments, the material 425 can be disposed between the carrier 125 and the surface 120 of the display 115. The translucent, reflective, material 425 may not affect the polarization state 110 of the light provided by the polarized light source 105 and passing through the display 115. Since the translucent, reflective, material 425 does not affect passage of the light provided by the polarized light source 105, data displayed on the display 115 will be legible to a user.

The translucent, reflective, material 425 may include any form of metallic or non-metallic material capable of reflecting all or a portion of the light provided by the second polarized light source 410 that is incident upon the surface 120 of the display 115. The translucent, reflective, material 425 may be incorporated directly into the display 115 to provide appropriate reflective properties to the display.

Figure 5:
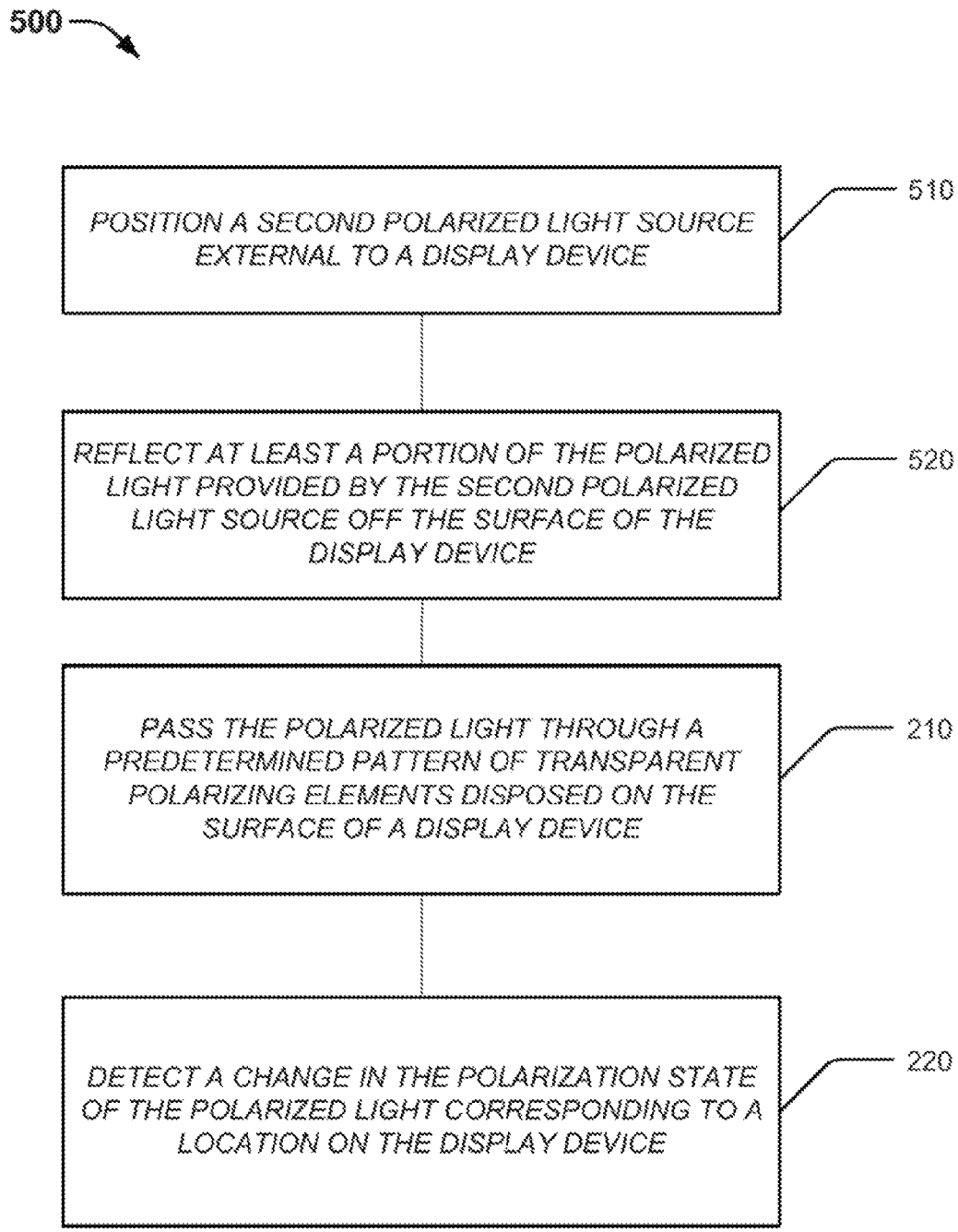
FIG. 5 is a flow diagram depicting a sample positional input method using an external second polarized light source, according to an embodiment described herein.
Figure 6:
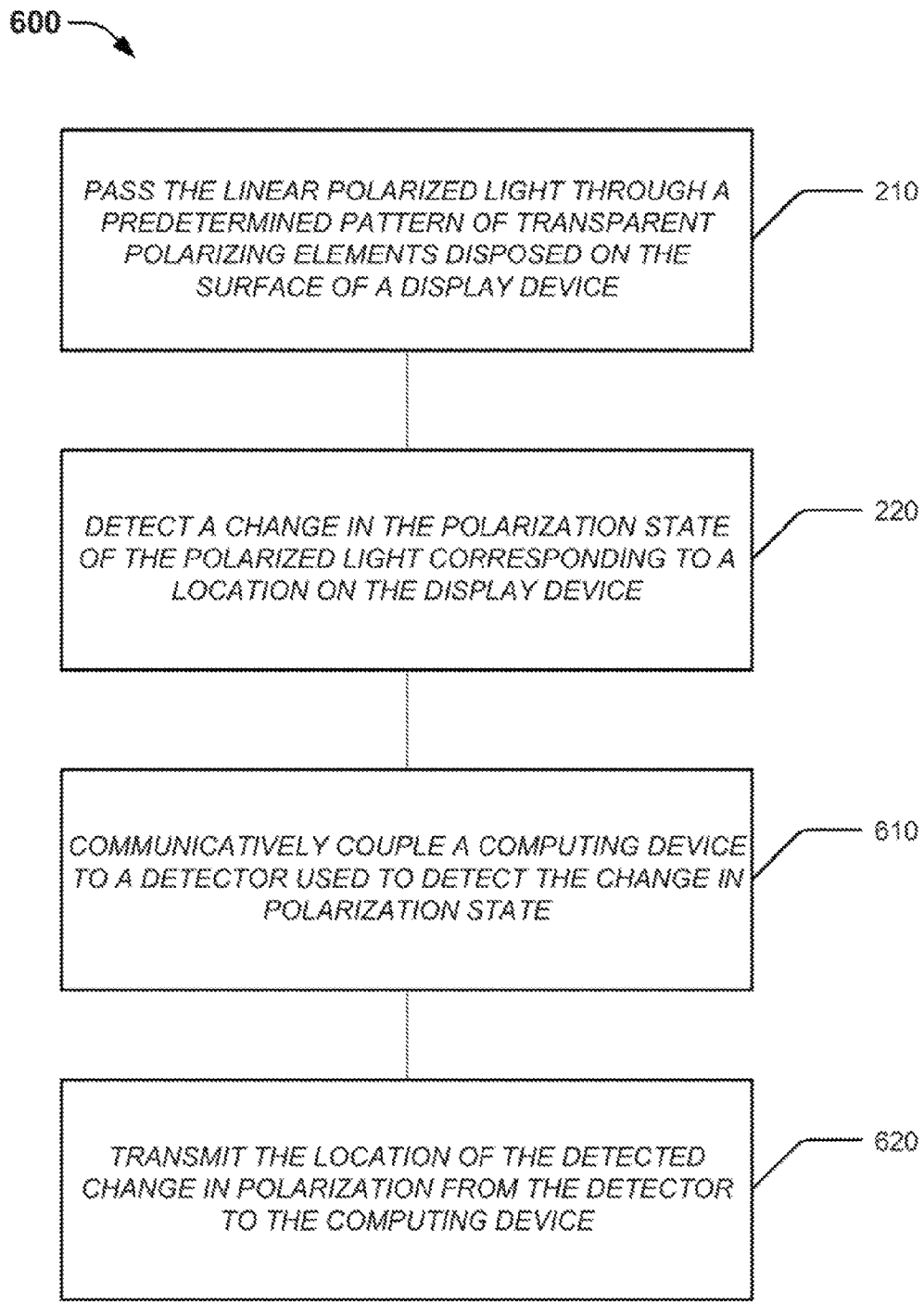
FIG. 6 is a flow diagram depicting a sample positional input method used as an input to an external computing device, according to an embodiment described herein.

FIG. 5 is a flow diagram depicting a sample positional input method 500 using an external second polarized light source 410, according to an embodiment. At 510 the second polarized light source 410 is positioned external to the display 115. The second polarized light source 410 can generate light having a second polarization state 415, for example a linearly polarized light with at least one wavelength differing from the light having the polarization state 110 provided by the polarized light source 105. The differing wavelengths of light between the polarized source 105 and the second polarized source 410 allow the detector to distinguish light generated by each source 105, 410. At least a portion of the light provided by the second polarized light source 410 falls incident upon the display 115.

A portion of me second polarized light 415 passes through the polarizing elements 130 while the remaining portion of the second polarized light 415 passes through only the carrier 125. Regardless of the passage through either the carrier 125 or the polarizing elements 130, at least a portion of the light provided by the second polarized light source 410 that is incident upon the display 115 is reflected by the translucent, reflective, material 425.

At 520 the translucent, reflective, material 425 reflects the incident light at least provided by the second polarized light source 410. Recall that at least a portion of the light provided by the second polarized light source 410 is in an intermediate polarized state as a consequence of having passed through the polarizing element. At least a portion of both the light having the second polarization state 410 (i.e., light provided by the second polarized light source 410 and NOT incident upon or passing through a polarizing element 125) and the intermediate polarized light (i.e., light provided by the second polarized light source 410, incident upon, and passing through a polarizing element 125) are reflected by the translucent, reflective, material 425.

Having already passed once through the polarizing element on its journey from the second polarized light source 410 to the display 115, the intermediate polarized light reflected from the material 425 may or may not pass back though the polarizing element 130. Because of the varied effects on polarization states due attributable to the carrier 125 and the polarizing elements, light exiting the display may have any one of a number of polarization states:

Source 105 through carrier 125=⅛ CCW phase retardation (e.g., polarization state 140).

Source 105 through polarizing element 130=⅛ CW phase retardation (e.g., polarization state 135).

Source 410 through carrier 125 inbound and reflected=⅛ CCW (inbound)+⅛ CCW (reflected)=¼ CCW phase retardation (e.g., polarization state 420).

Source 410 through polarizing element 130 inbound and reflected=⅛ CW (inbound)+⅛ CW (reflected)=¼ CW phase retardation (e.g., polarization state 430).

Source 410 through carrier 125 inbound and through polarizing element 130 reflected=⅛ CCW (inbound)=⅛ CW (reflected)=no retardation (e.g., polarization state 415).

Source 41o through polarizing element 130 inbound and through carder 125 reflected=⅛ CW (inbound)=⅛ CCW (reflected)=no retardation (e.g., polarization state 415).

Thus, a total of five polarization states may be emitted from the display 115 when using the second polarized light source 410. The use of a detector 130 sensitive to only one of the five polarization states, for example sensitive only to polarized light having a ¼ CW phase retardation, enables the precise determination of detector location on the surface 120 of the display 115.

FIG. 8 is a flow diagram depicting a sample positional input method 500 used as an input to an external computing device, according to an embodiment. Communicatively coupling the defector 145 to a computing device permits the transmission of input data related at least in part to the location of the detector 145 on the surface 120 of the display 115 to the computing device. Such data may be used, for example, where the display 115 functions at least in part as a data entry device such as a tablet. The use of a display device as a tablet readily permits the reconfiguration of the display to meet user requirements.

At 510 the detector 145, serving at least in part as an input device, can be coupled to a computing device. At 620 the location of the detector 145 on the display 115 can be transmitted to the computing device.

What is claimed is:

1. A positional input method, comprising:
   passing a polarized light generated by a source through a predetermined pattern of visibly transparent polarizing elements disposed on a surface of a display;
   detecting a change in the polarization state of the polarized light corresponding to a location on the surface;
   positioning the source external to the display;
   generating a circularly polarized light using the source; and
   reflecting at least a portion of the circularly polarized light from the surface.

2. The method of claim 1, further comprising:
   generating a linearly polarized light using a liquid crystal display backlight as the source; and
   passing the linearly polarized light through the LCD display prior to passing the linear polarized light through the pattern of visibly transparent polarizing elements disposed on the surface of the display.

3. The method of claim 1, further comprising:
   communicatively coupling a computing device to a detector which detects the change in the polarization state; and
   transmitting the location of the detected change in the polarization state of the polarized light on the surface from the detector to the computing device.

4. The method of claim 3, wherein transmitting the location of the detected change in the polarization state of the polarized light on the surface from the detector to the computing device comprises one of:
   transmitting the location data wirelessly from the detector to the computing device; or
   transmitting the location data from the detector to the computing device via one or more conductors.

5. The method of claim 1, the change in polarization state consisting of changing at least a portion of the polarized light passing through at least a portion of the visibly transparent polarizing elements from a linearly polarized light to circularly polarized light.

6. A positional input system, comprising:
   a polarized light source;
   a visibly masked programmable phase retarder film to provide a predetermined pattern of visibly transparent polarizing elements to change the polarization state of the polarized light; and
   a detector to determine a location based upon the change in the polarization state of the polarized light.

7. The system of claim 6, further comprising:
   a display;
   the pattern of visibly transparent polarizing elements to change the polarization state of the polarized light disposed on a viewable portion of a surface of the display.

8. The system of claim 7, the display device comprising:
   a liquid crystal display (LCD); and
   the polarized light source consisting of a linearly polarized LCD backlight.

9. The system of claim 7, further comprising:
a surface to reflect at least a portion of light incident thereupon, disposed between the predetermined pattern of visibly transparent polarizing elements to change in the polarization state of the polarized light and the viewable portion of the surface of the display.

10. The system of claim 9, further comprising:
a handheld member housing the polarized light source and the detector;
the polarized light source consisting of a circularly polarized light source.

11. The system of claim 6, further comprising:
a handheld member housing the detector;
the polarized light source consisting of a linearly polarized light source.

12. A positional input system, comprising:
a liquid crystal display ("LCD") including a linearly polarized backlight;
a plurality of visibly transparent polarizing elements disposed in a predetermined pattern on an exterior surface of the liquid crystal display;
each of the visibly transparent polarizing elements to change in the polarization state of the linear polarized light to circularly polarized; and
a handheld member including:
a detector to determine a location on the LCD based upon the change in the polarization state of the linear polarized light; and
a transmitter to transmit the location of the handheld member to a computing device communicatively coupled to the handheld member.

13. The system of claim 12, wherein the transmitter comprises one of:
a transmitter wirelessly coupled to the computing device;
a transmitter coupled to the computing device via one or more conductors.

* * * * *